Figure 1:
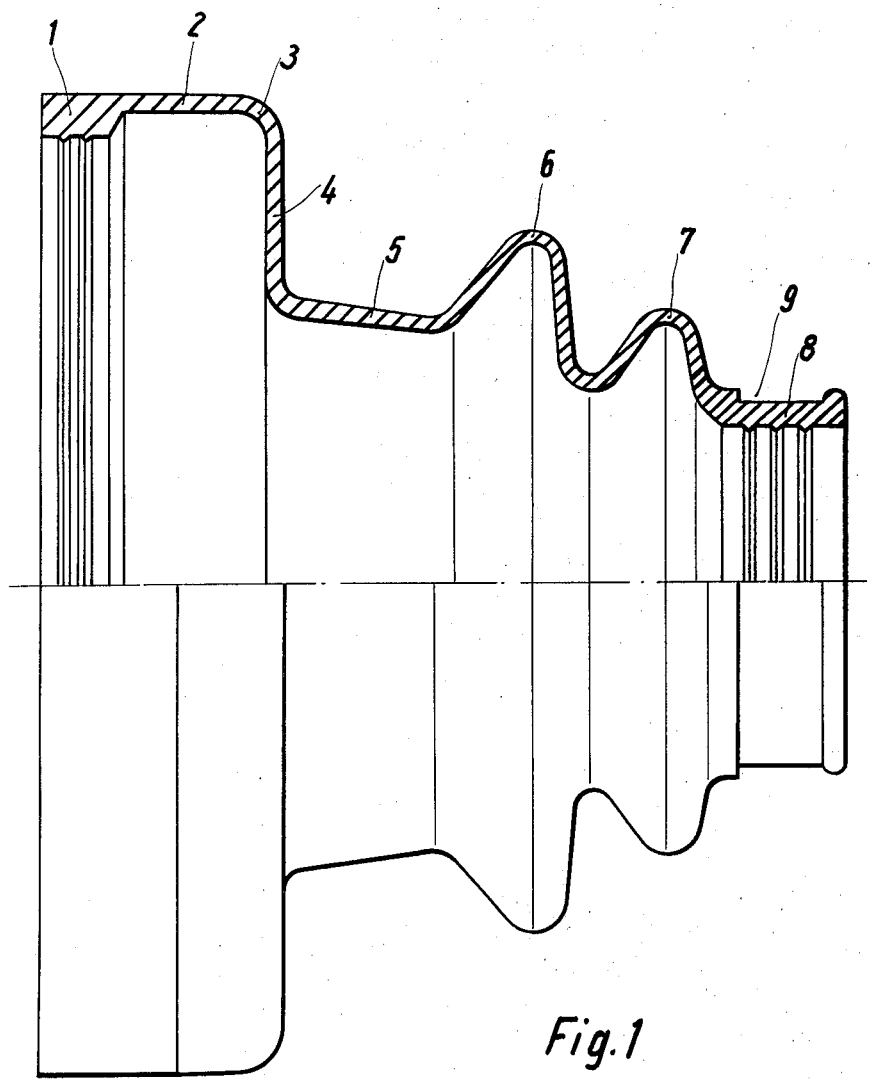

United States Patent [19]
Hadick et al.

[11] 3,830,083
[45] Aug. 20, 1974

[54] FLEXIBLE PROTECTIVE HOUSING FOR A UNIVERSAL JOINT AND SHAFT

[75] Inventors: Theodor Hadick, Lohmar; Karl-Heinz Muller, Wissen, both of Germany

[73] Assignee: Uni-Cardan AG, Lohmar/Rheinl., Germany

[22] Filed: Sept. 13, 1973

[21] Appl. No.: 396,689

[52] U.S. Cl............................ 64/32 F, 277/212 FB
[51] Int. Cl............................................. F16d 3/84
[58] Field of Search .................... 64/32 F, 32 R, 6; 277/212 FB

[56] References Cited
UNITED STATES PATENTS

| | | |
|---|---|---|
| 3,255,839 | 6/1966 | Goldman............................ 64/32 F |
| 3,623,340 | 11/1971 | Maas................................... 64/32 F |
| 3,683,421 | 8/1972 | Martinie....................... 277/212 FB |

*Primary Examiner*—Louis R. Prince
*Assistant Examiner*—Robert I. Smith
*Attorney, Agent, or Firm*—Edmund M. Jaskiewicz

[57] ABSTRACT

A flexible protective housing or sealing boot for universal joint and a shaft has a cylindrical or tapering portion extending from its attachment to a component of a universal joint and this portion merges into a radial portion which in turn merges into a cylindrical or tapered portion having a smaller diameter than the first mentioned axial portion of the boot. One or more corrugations or folds of progressively decreasing diameter are connected to the second axially extending portion and the last corrugation merges into a mounting portion for mounting upon the shaft.

9 Claims, 2 Drawing Figures ial portion 4 is a conical inwardly tapering spacer portion 5 which is semi-rigid so as to be capable of retaining its shape. The rigidity of the spacer portion 5 may be increased by the provision of annular reinforcing members (not shown in the drawings) over the inner peripheral surface adjacent the ends of the spacer portion.

FLEXIBLE PROTECTIVE HOUSING FOR A UNIVERSAL JOINT AND SHAFT

The present invention relates to a flexible protective housing or sealing boot for a universal joint and a shaft extending therefrom, more particularly, to such a housing which can readily accommodate sliding and angular movement of the shaft with respect to the universal joint.

Flexible protective housings or sealing boots have been proposed for use in drive shafts having a universal joint therein. One end of the housing is generally rigidly and sealingly connected to the universal joint or a component thereof and the other end of the housing is connected to the shaft. The housing also comprises a deformable or flexible zone adjacent to each of its two mounting ends to accommodate the relative angular and axial displacement between the joint and the shaft. A substantially rigid or form retaining portion is generally provided in the housing between the two deformable zones.

A protective housing of this general type has been provided with corrugations or folds to constitute these two deformable zones. (German AS 1 600 429) As a result of this particular structure the protective housing is suitable essentially for use with lateral or power take-off shafts of motor vehicles. A major disadvantage of such a protective housing is that the corrugation adjacent a mounting end of the housing is urged outwardly by a spring and is therefore subjected to great stresses during operation as a result of centrifugal forces as well as by the forces exerted by the lubricant within the housing since the lubricant itself is subjected to centrifugal forces.

In order to employ such a housing on a sliding joint the corrugations of the housing must have good deformability properties so that the housing does not oppose sliding displacement of the shaft. However, if the structure is selected on the basis of this consideration this will produce particularly harmful effects in the region of the boot that has the largest diameter which is the region adjacent the universal joint since this region is particularly subjected to stresses applied by the lubricant during rotation of the shaft.

It is therefore the principal object of the present invention to provide a flexible protective housing for a universal joint and a shaft extending therefrom which has improved characteristics with respect to angular and axial displacements between the shaft and the joint.

It is another object of the present invention to provide such a flexible protective housing wherein centrifugal forces acting upon the housing as well as the centrifugal forces applied by the lubricant within the housing are significantly reduced and will not affect adversely the rotation of the housing at high rotational speeds.

According to the present invention, there may be provided a flexible protective housing or sealing boot which has an axially extending cylindrical or tubular expanding or inwardly tapering portion adjacent the mounting end of the joint side of the housing. The axial portion merges into a flexible radial portion which is followed by a cylindrical or tapering spacer portion having a smaller diameter than the axially extending portion of the housing. One or more corrugations of progressively decreasing external diameter are connected to the spacer portion with the last corrugation merging into the mounting portion of the shaft side of the housing. In the disclosed structure of the housing the radial portion is particularly adapted to absorb bending or angular displacements of the shaft with respect to the joint and the corrugated portion is particularly adapted to absorb axial or sliding displacements. The smaller diameter of the corrugations adjacent the shaft mounting of the housing means a small change in volume during axial displacement. Also, the smaller diameter corrugations will not be subjected to relatively great centrifugal forces both from the housing itself and from the lubricant within the housing during rotation of the joint. The last corrugation or where there is no axial displacement and only a single corrugation is employed then the latter may be made semi-rigid in order to absorb counter-bending of the shaft with respect to the joint.

The radial portion of the boot adjacent the joint mounting region has very good resistance to centrifugal forces occurring during rotation of the housing. In addition, the tubular spacer portion may be provided with increased stability to centrifugal force deformation (from its own mass and from the lubricant) by having annular bulging portions therein. In a similar manner, the wall thickness of the conical spacer portion may increase in the direction toward the larger diameter of the housing. The radial portion and the substantially cylindrical portion of the housing are thus subjected to angular or bending stresses only.

Figure 2:
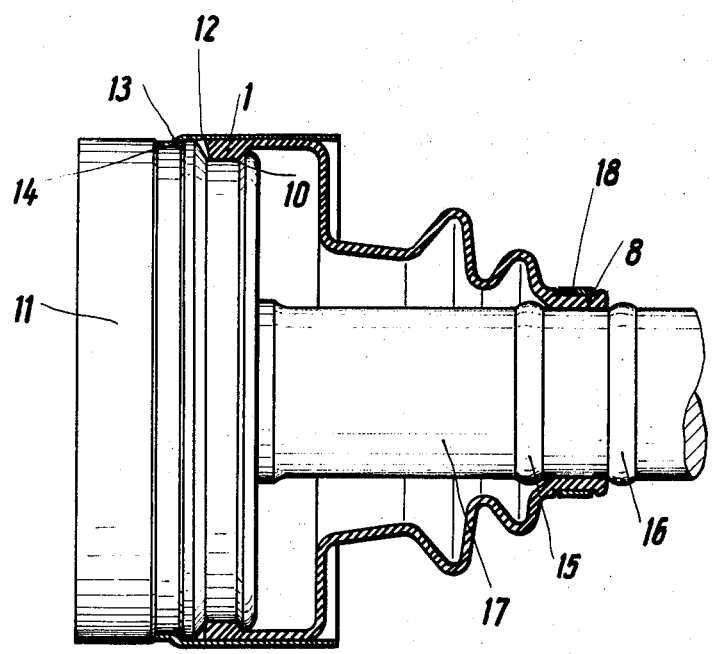

Other objects and advantages of the present invention will be apparent upon reference to the accompanying description when taken in conjunction with the following drawings, which are exemplary, wherein;

FIG. 1 is an elevational view of the flexible protective housing according to the present invention with the upper portion of the housing being shown in a longitudinal half section; and FIG. 2 is an elevational view of the housing mounted upon a joint and a shaft with the housing being shown in section.

Proceeding next to the drawings wherein like reference symbols indicate the same parts throughout the various views a specific embodiment of the present invention will be described in detail. As may be seen in FIG. 1, the housing comprises a mounting portion 1 which adapted to mount or attach the housing to the universal joint or a component of the joint. The mounting portion 1 comprises an inwardly directed bead upon which may be formed one or more inwardly directed annular sealing lips. A cylindrical portion 2 extends axially from the mounting portion. The axial portion may be cylindrical or conical tapering inwardly or outwardly.

The axial portion 2 merges at radius 3 into a flexible radial portion 4 which is directed inwardly of the cylindrical portion 2. The radial portion 4 functions substantially as a membrane and in conjunction with the axial portion 2 absorbs bending or angular displacement of the shaft with respect to the joint.

Extending from the smaller diameter end of the radial portion 4 is a conical inwardly tapering spacer portion 5 which is semi-rigid so as to be capable of retaining its shape. The rigidity of the spacer portion 5 may be increased by the provision of annular reinforcing members (not shown in the drawings) over the inner peripheral surface adjacent the ends of the spacer portion.

Extending from the spacer portion 5 are two corrugations or folds 6 and 7 whose outer diameter progressively decreases as shown in the drawing. The second corrugation 7 functions predominantly to absorb counter-bending while the first corrugation 6 predominantly absorbs axial or sliding displacement. The last corrugation 7 merges into a mounting portion 8 adapted for attachment or mounting onto the shaft extending from the universal joint. The mounting portion 8 comprises a cylindrical zone having a plurality of internal annular sealing lips and is provided on its outer peripheral surface with a groove 9 for receiving a spring clip.

For a particular application of the housing according to the present invention a substantially semi-rigid web or radial portion may be provided between the joint mounting portion of the housing and the tubular portion extending therefrom. This web portion extends substantially radially outwardly with respect to the tubular portion and functions primarily to bridge any existing gap.

The housing according to the present invention is mounted on a universal joint and shaft extending therefrom as shown in FIG. 2. The internal bead on the mounting portion 1 is positioned in an external annular groove 10 provided in the outer joint element 11 of the universal joint. A metal sleeve 12 is positioned over the mounting portion 1 and is dimensioned to extend over the cylindrical portion 2. The sleeve 12 has a tapering configuration 13 on one end thereof and this tapered portion is positioned in a further external annular groove 14 provided in the outer joint element 11 to provide a secure axial fastening of the sleeve and joint. The sleeve 12 functions to relieve the cylindrical portion 2 from stresses of centrifugal forces. The sleeve will also relieve the web portion 4 from some stresses of the forces and has the further advantage of protecting the housing in its highly stressed region against damages which may be inflicted from external sources such as by rocks or other objects impinging against the housing.

The shaft mounting portion 8 of the housing is positioned between 2 annular ribs 15 and 16 formed on the shaft 17 which extends from the universal joint. In addition, a spring or tension clip 18 is positioned in the groove 9 on the shaft mounting portion 8 to establish a firm connection between the housing and the shaft 17.

According to the present invention the first corrugation which would be corrugation 6 in the present embodiment may be constructed so as to first be directed outwardly from the spacer portion 5 and then inwardly.

While the protective housing as disclosed herein is particularly adapted for universal joints which permit angular as well as axial displacement the housing may be modified so as to be particularly adapted for joints with angular displacements only. Such a joint would provide that the deformation zone next to the spacer portion would first comprise an inwardly directed region merging into the mounting portion on the shaft side of the housing. In effect, a membrane or web-like portion is thus formed which is directed radially inwardly so as to merge into the shaft mounting portion of the housing.

Thus it can be seen that the present invention has provided a flexible protective housing or sealing boot for a universal joint and a shaft extending therefrom which is particularly adapted to accommodate angular and axial displacement of the shaft with respect to the joint. Further, stresses applied to the housing as a result of centrifugal forces acting upon the housing and upon the lubricant within the housing are significantly reduced and do not have any destructive effects on the housing even when rotating at relatively high speeds. Such shafts upon which the protective housing may be applied may reach rotary speeds of 6,000 r.p.m.

It will be understood that this invention is susceptable to modification in order to adapt it to different usages and conditions within this invention as may fall within the scope of the appended claims.

What is claimed is:

1. A flexible protective housing for a universal joint and a shaft extending therefrom comprising a first mounting portion adapted for mounting on a component of a universal joint, a first tubular portion extending axially from said first mounting portion, a flexible radial portion extending inwardly from said first tubular portion and capable of accommodating relative movement between the universal joint and the shaft, a second tubular portion having a smaller diameter than said first tubular portion and extending axially from said radial portion, a corrugated portion having one end thereof connected to said second tubular portion and having progressively decreasing diameters in a direction away from said second tubular portion, and a second mounting portion extending from the other end of said corrugated portion and adapted for mounting upon a shaft extending from the universal joint.

2. A flexible protective housing as claimed in claim 1 wherein said radial portion is semi-rigid and extends substantially radially outwardly from said second tubular portion.

3. A flexible protective housing as claimed in claim 1 wherein said first tubular portion is cylindrical.

4. A flexible protective housing as claimed in claim 1 and comprising a sleeve enclosing said first tubular portion and said radial portion.

5. A flexible protective housing as claimed in claim 4 wherein said sleeve is of metal.

6. A flexible protective housing as claimed in claim 1 wherein the corrugation adjacent said second tubular portion has a first surface extending outwardly on the adjacent end of said second tubular portion and a second surface extending inwardly.

7. A flexible protective housing as claimed in claim 1 wherein the surface of the corrugation away from said second tubular portion merges into said second mounting portion, said merging corrugated surface also being capable of accommodating relative movement between said universal joint and said shaft.

8. A flexible protective housing as claimed in claim 1 wherein the inner diameter of a surface of a corrugated facing said second mounting portion is smaller than the inner diameter of the surface of the corrugation facing said second tubular portion.

9. A flexible protective housing as claimed in claim 1 wherein said corrugated portion comprises a plurality of corrugations having progressively decreasing diameters in the direction away from said second tubular portion.

* * * * *